UNITED STATES PATENT OFFICE.

HENRY SPENCER BLACKMORE, OF MOUNT VERNON, NEW YORK.

PROCESS OF MAKING SULFURIC ANHYDRID.

SPECIFICATION forming part of Letters Patent No. 686,022, dated November 5, 1901.

Application filed February 16, 1900. Serial No. 5,513. (No specimens.)

*To all whom it may concern:*

Be it known that I, HENRY SPENCER BLACKMORE, a citizen of the United States, residing at Mount Vernon, in the county of Westchester and State of New York, have invented certain new and useful Improvements in Processes of Producing Sulfuric Anhydrid; and I do hereby declare the following to be a full, clear, and exact description of the invention, such as will enable others skilled in the art to which it appertains to make and use the same.

The object of my invention is to produce sulfuric anhydrid (sulfur trioxid;) and it consists in oxidizing sulfur dioxid by action of a metallic oxid or substances containing the same.

It is well known that certain metals—such as iron, copper, &c.—have a variable affinity for oxygen, according to the temperature at which maintained. For example, steam passed over iron at white heat is decomposed, producing iron oxid and hydrogen gas, while if the temperature of the iron oxid thus produced is lowered to a low red heat and the same hydrogen gas conducted over it the affinities are so reversed that the oxygen is again taken up by the hydrogen, regenerating steam and reducing iron to a metallic state, known commercially as "iron-by-hydrogen." Utilizing this property of the metal, I have conducted sulfur dioxid over iron oxid at low temperatures—*i. e.*, below the dissociating-point of sulfur trioxid—and found that it has the property of absorbing the oxygen therefrom, reducing the iron oxid and producing sulfur trioxid, which distils or sublimes and is finally condensed.

The reaction which takes place may be illustrated by the following chemical formula or equation: Employing ferric oxid—

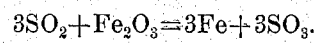

Employing ferroso ferric oxid—

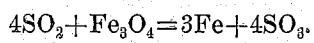

It is obvious that the temperature must not be maintained above the dissociating-point of sulfur trioxid; otherwise it would preclude its formation.

The manner in which I proceed to carry out my process on a commercial scale is to place in a retort or container iron oxid and temporarily heat the same slightly—say about 212° Fahrenheit—to start the operation, then conveying over or through the said iron oxid sulfur dioxid, which has preferably been heated, so that thereafter the reaction may be maintained by the occluded heat of the sulfur dioxid, and thus avoiding the application of directly-applied heat as much as possible, which is hard to regulate and keep below the dissociating-point of the sulfur trioxid produced. The heated sulfur dioxid passed over the metallic oxid in ordinary cases sufficiently heats the same after starting the operation to assure the reaction continuously until the iron oxid is reduced; also, considerable heat is liberated by the oxidation of the sulfur dioxid in direct contact with the metallic oxid, so that the reaction is practically maintained after the first heating, which merely serves to start the operation, by the combined heat of that occluded by the introduced sulfur dioxid and that liberated during reaction. The sulfur trioxid produced is distilled or sublimed and finally condensed. The iron reduced by oxidation of the sulfur dioxid is then reoxidized by simply elevating the temperature and passing air or oxygen over the same, so that the oxidizing agent (metallic oxid) is regenerated and reused over and over again without loss, thus rendering the process practically continuous.

It is obvious that other metals, such as copper, may be employed without departing from the spirit of my invention, which consists in oxidizing sulfur dioxid by the action of metallic oxid.

If metallic oxid heats too rapidly during reaction, it may be refrigerated to keep below dissociating-point of sulfuric anhydrid.

When cupric oxid is employed, the reaction may be illustrated by the following chemical formula or equation:

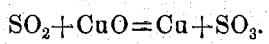

The term "metallic oxid" or "iron oxid" as herein employed is intended to include any substance containing a metallic oxid which will give up its oxygen to oxidize sulfur dioxid to sulfur trioxid under the conditions described as well as the pure metallic oxid *per se.*

Having now described my invention, what

I claim as new, and desire to secure by Letters Patent, is—

1. The process of producing sulfuric anhydrid ($SO_3$) which consists in oxidizing sulfur dioxid by the action of metallic oxid.

2. The process of producing sulfuric anhydrid, which consists in conveying sulfur dioxid in contact with metallic oxid at a temperature below the dissociating-point of sulfur trioxid.

3. The process of producing sulfuric anhydrid, which consists in exposing a metallic oxid to the action of heated sulfur dioxid.

4. The continuous process of producing sulfuric anhydrid ($SO_3$) which consists in exposing metallic oxid to the action of sulfur dioxid at a temperature below the dissociating-point of sulfur trioxid, conveying the sulfur trioxid produced to a condenser, elevating the temperature of the metallic residue, passing oxygen over the same, cooling, exposing the product to the action of more sulfur dioxid and continuing the process as before.

5. The process of producing sulfuric anhydrid, which consists in exposing iron oxid to the action of sulfur dioxid in a heated state.

In testimony whereof I affix my signature in presence of two witnesses.

HENRY SPENCER BLACKMORE.

Witnesses:
H. N. JENKINS,
WARREN C. STONE.